United States Patent [19]

Szwolkon

[11] 3,758,976
[45] Sept. 18, 1973

[54] FISH HOOK AND LURE ASSEMBLY

[76] Inventor: Henry E. Szwolkon, 456 Hollister Ave., Bridgeport, Conn. 06607

[22] Filed: Apr. 7, 1972

[21] Appl. No.: 241,948

[52] U.S. Cl............... 43/42.24, 43/42.37, 43/43.16
[51] Int. Cl............................................ A01k 85/00
[58] Field of Search................... 43/42.24, 42.37, 43/42.33, 43.16, 42.28, 42.06

[56] References Cited
UNITED STATES PATENTS
3,680,249   8/1972   Chiarenza................. 43/42.28 X FOREIGN PATENTS OR APPLICATIONS
112,954   5/1968   Norway.................... 43/42.24
478,773   7/1951   Italy....................... 43/42.24
117,888   10/1969  Norway.................... 43/42.24
91,744    12/1961  Denmark.................... 43/42.24
94,124    2/1959   Norway.................... 43/42.24
118,500   4/1947   Sweden.................... 43/42.24

Primary Examiner—F. Barry Shay
Assistant Examiner—James H. Czerwonky
Attorney—Arthur A. Johnson

[57] ABSTRACT

There is disclosed a fish hook and lure assembly having a plastic tube through which the shank of the hook extends with the barb end of the hook projecting through an oval opening at one end of the tube and the eye and leader knot lying in a cavity at the other end of the tube. The shank is movable in the tube to expose the eye for the reception of the end of the leader. The tube is resiliently yieldable to permit the leader and eye end of the hook to be inserted by placing the eye end in the oval opening and forcing the hook through the tube until the eye is located in said cavity. The cavity is formed by a sleeve attached at one end to said other end of the tube. The remainder of the sleeve has an internal dimeter greater than the diameter of the eye, while the tube has an internal diameter normally less than the eye diameter.

1 Claim, 4 Drawing Figures

PATENTED SEP 18 1973  3,758,976
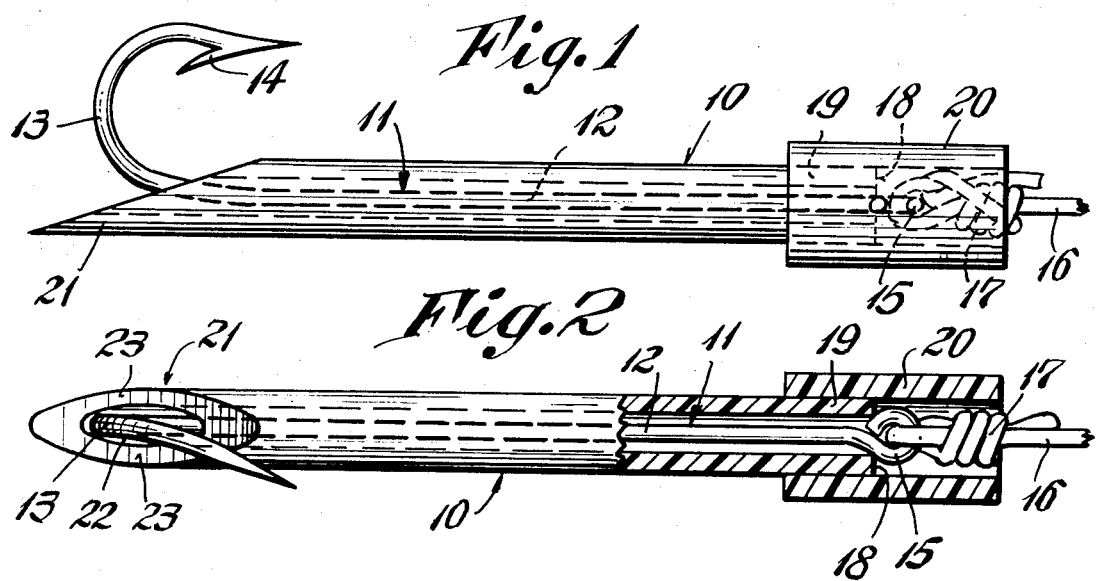
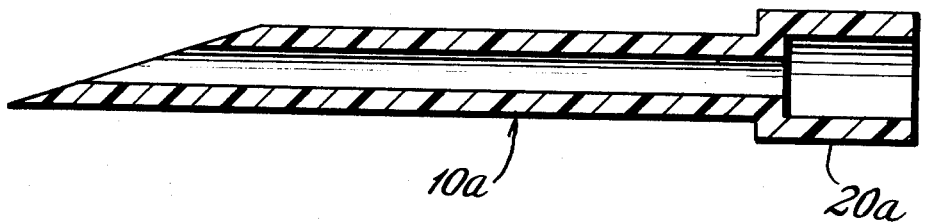

FISH HOOK AND LURE ASSEMBLY

Heretofore many fish lures and fish hook assemblies have been proposed, but these have been rather elaborate and many have been quite expensive. One such article consisted of a tube having one end partially closed and provided with a ring at the other end to which a swivel is connected, a short lead being attached to the inner end of said swivel and the other end of the short lead being connected to another swivel to which the hook is connected. The hook extends substantially beyond the tube and the tube at its open end has a downturned portion to cause the tube to oscillate in the water. It will thus be seen that the device referred to is complicated and quite expensive to make and assemble.

An object of this invention is to provide an improved fish hook and leader assembly which is simple in construction, easy to assemble and cheap to manufacture, and yet which has the appearance, in trolling or in reeling in a cast, of a live fish on which the sought-for fish feed.

Briefly, this has been accomplished by providing a plastic tube having an inside diameter large enough to permit the hook to freely move laterally in the tube but sufficiently smaller than the diameter of the eye of the hook to resist movement of the hook outwardly of the tube in one direction while the barb end of the hook projects from an oval hole at the other end of the tube, the barb end engaging the edge of the oval hole to limit the movement of the shank in the other direction to an amount only sufficient to expose the eye which normally is contained in an enlarged cavity at that end of the tube so that a leader may be passed through and knotted on the eye.

The tube may be transparent or colored, and is made of flexible resilient material so that in assembling the lure and hook the eye end of the hook may be placed in the oval opening at one end of the tube and the shank and eye forced through the tube until the eye is located in said cavity.

Other features and advantages will hereinafter appear.

In the accompanying drawings:

FIG. 1 is a side elevation of the leader and hook assembly of the present invention showing in dotted lines the eye of the hook and the knot of the leader attached thereto.

FIG. 2 shows the assembly shown in FIG. 1 rotated 90°, part of the tube and the cavity-containing end being shown in section.

FIG. 3 shows the hook of the present invention connected by a leader which in turn is connected to a bobber, the other end of which is attached to the fishing line.

FIG. 4 is a sectional view of a plastic tube in which the body of the tube and the sleeve are molded in one piece.

As shown in the accompanying drawings, the lure and hook assembly of this invention comprises a lure portion in the form of a flexible plastic tube 10 which may be cut from a continuous strip of tubing. The tube 10 may be transparent or may be made of colored material or may be coated or painted with the desired colored material. However, successful results have been obtained with the use of clear substantially colorless plastic material.

Within the tube 10 there is a fish hook 11 having a shank 12 having at one end an arcuate return bend 13, the end of which has a barb 14. The other end of the shank 12 has an eye 15 to which the end of a leader 16 may be tied with a suitable knot 17. The diameter of the eye 15 is slightly greater than the passageway of the tube 10 which has a shoulder 18 to resist longitudinal movement of the hook through the tube.

As shown in FIGS. 1, 2 and 3, the end 19 of the tube is provided with a sleeve 20 which is cemented to the tube, as shown in FIGS. 1 and 2, and projects beyond the end and forms sufficient space to receive the eye 15 and the knot 17 when the hook is in normal position in the tube.

The other end 21 of the tube 10 is formed to slant diagonally from one side of the tube to the other, so as to form an oval opening 22, and the length of the shank 12 and tube 10 is such that normally the arcuate return bend 13 of the hook projects from said oval opening 22 to expose the barb 14 to be struck by a fish in pursuit of the lure.

The sides 23 of the opening allow the hook to oscillate through a wide angle but yieldingly prevent the hook from making a complete rotation in the tube.

As the lure is drawn through the water in trolling or reeling in a cast, water entering the end 19 of the tube flares out from the slanting end 21 and causes a commotion to attract fish in the vicinity of the lure.

In order to facilitate the assembly for sale and use of the lure and hook, the tube 10 is made of resiliently stretchable or deformable plastic material so that the eye 15 can be inserted through the oval opening 22 and pushed through the tube until the eye passes out of the end 18. If desired, the insertion of the hook 11 can be facilitated by passing the leader 16 through the empty tube from the end 19 to and through the oval opening 22, fastening the leader 16 to the hook and pulling the leader 16 and shank 12 of the hook through the tube until the eye 15 and knot 17 rest in the sleeve 20.

The lure and hook assembly may be used with the bobber 24 which may be interposed between the leader 16 and the fishing line 25 as shown in FIG. 3, which in a well known manner causes the lure and hook assembly to move erratically through the water.

As shown in FIG. 4, the sleeve portion 20a may be formed integral with the tube 10a.

It should be understood that the tube and hook may be made in various sizes, the size depending on the size of the fish being sought. For small fish such as snapper, a hook about 1½ inches long and a tube about 1¾ inches long have been found very satisfactory.

Variations and modifications may be made within the scope of the claims and portions of the improvements may be used without others.

I claim:

1. A fish lure and hook assembly comprising a hook having a shank having at one end an eye for attachment directly to a leader and at the other end a barb point, and a plastic tube extending between the bight portion of the hook and the eye and enclosing the shank of the hook, said tube having a passageway larger in diameter than that of the shank of the hook, but smaller than that of the eye, through which passageway the shank of the hook extends, said tube having a slanting first end forming an angle with the axis of the tube and forming an oval opening through which the barb end of the hook extends, a second end of the tube having attached thereto one end of a sleeve, the remainder of the sleeve projecting beyond the end of the tube and forming a cavity in which the eye portion of the hook and the end of a leader tied thereon may lie said remainder of said sleeve having an internal diameter throughout its length greater than the diameter of the eye; and said second end of the tube providing a shoulder to be engaged by the eye to prevent movement of the hook from the tube in the direction toward the first end of the tube while the barb end of the hook engages the edge of said oval and prevents excessive longitudinal movement of the hook in the direction of the second end of the tube, said tube being made of yieldable plastic material to permit the hook to be assembled in the tube by forcing the eye of the hook through the passageway in the tube until the eye of the hook enters said cavity, said oval being dimensioned to permit sufficient relative longitudinal movement between the shank of the hook and the tube so that the eye may be moved sufficiently beyond the opposite end of said sleeve to permit the end of the leader to be tied to the eye, after which the eye and the tied end of the leader may recede into the cavity to be protected by the projecting end of the sleeve.

* * * * *